United States Patent
Dhanabalan et al.

(10) Patent No.: US 10,536,875 B2
(45) Date of Patent: *Jan. 14, 2020

(54) SYSTEM AND METHOD FOR SEAMLESS TCP CONNECTION HANDOFF

(71) Applicant: CITRIX SYSTEMS, INC., Fort Lauderdale, FL (US)

(72) Inventors: Praveen Raja Dhanabalan, Karnataka (IN); Chaitra Maraliga Ramaiah, Karnataka (IN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/043,392

(22) Filed: Jul. 24, 2018

(65) Prior Publication Data

US 2018/0332495 A1 Nov. 15, 2018

Related U.S. Application Data

(63) Continuation of application No. 14/742,254, filed on Jun. 17, 2015, now Pat. No. 10,172,028.

(51) Int. Cl.
H04W 28/02 (2009.01)
(52) U.S. Cl.
CPC .............................. *H04W 28/0226* (2013.01)
(58) Field of Classification Search
None
See application file for complete search history.

(56) References Cited

U.S. PATENT DOCUMENTS

| | | | |
|---|---|---|---|
| 7,359,317 B1* | 4/2008 | DeCesare | H04L 69/40 370/219 |
| 7,940,650 B1* | 5/2011 | Sandhir | H04L 45/28 340/2.23 |
| 10,172,028 B2* | 1/2019 | Dhanabalan | H04W 28/0226 |
| 2010/0318991 A1* | 12/2010 | Venkitachalam | G06F 9/45533 718/1 |

* cited by examiner

*Primary Examiner* — James P Duffy
(74) *Attorney, Agent, or Firm* — Allen, Dyer, Doppelt + Gilchrist, PA (57) ABSTRACT

A system for optimizing network traffic is described. The system includes a primary appliance having a first handoff engine in an active state. The primary appliance is configured to receive from a first switch one of first data or a copy of first data to be provided to a second switch. The system also includes a secondary appliance having a second handoff engine in a passive state, where the secondary appliance is configured to receive from the first switch the other of the first data or the copy of the first data. The second handoff engine is configured to monitor state data provided by the first handoff engine, determine a condition of the first handoff engine using the state data and the other of the first data or the copy of first data, and based on the determination, provide instructions for the secondary appliance to provide the other of the first data or the copy of the first data to the second switch.

18 Claims, 8 Drawing Sheets

SYSTEM AND METHOD FOR SEAMLESS TCP CONNECTION HANDOFF

RELATED APPLICATIONS

This application is a continuation of U.S. application Ser. No. 14/742,254 filed Jun. 17, 2015, which is hereby incorporated herein in its entirety by reference.

BACKGROUND

A middlebox is a network appliance that manipulates Internet traffic by optimizing data flow across the network. Middleboxes can be configured as wide area network ("WAN") optimizers and can be deployed in pairs across two geographically separated locations to optimize data traffic between the two middleboxes. Middleboxes can be connected through a single link or multiple links such as a leased line link and a broadband link. Middleboxes proxy the TCP connections by monitoring the transmission control protocol (TCP) connection on a first link and forming a new TCP connection based on the first link.

For high availability networks, it is common to see data center sites deploying a secondary backup device. In such situations, the middlebox associated with the data center can be replaced with two parallel middleboxes in between two switches, with one of the parallel middleboxes being an active primary device, and the other being a secondary passive device acting as a backup in case the primary device malfunctions.

By organizing middlebox devices for high availability, some network systems are configured to mitigate network traffic interruptions if a primary device failure occurs. When the primary (active) device experiences a hardware or software failure, the port connected to the switch is reset and the switch redirects any future traffic to the secondary link connected to the secondary (passive) device. Since services are already started on the secondary device, TCP communications across the connection begin to flow across the secondary device that is now acting as the primary. The connections that were proxied by the former primary are disrupted and the end points have to restart these connections, which will be served by the secondary device.

In situations where there is a software failure at the primary device, the primary device would switch off its interfaces, in a way that the switch will enable the port connected to the secondary device. The problem with this fail over mechanism is that it takes some time for the primary to detect a software failure, and hence to trigger a port reset. Further, the active connections in the primary devices fail as the transmission communication protocol connections are proxied, and would be reset. This in effect would result in network disruption for a short time, and also would result in poor user experience.

SUMMARY

In some aspects, a system for optimizing network traffic is described. The system includes a primary appliance having a first handoff engine in an active state. The primary appliance is configured to receive from a first switch one of first data or a copy of first data to be provided to a second switch. The system also includes a secondary appliance having a second handoff engine in a passive state, where the secondary appliance is configured to receive from the first switch the other of the first data or the copy of the first data. The second handoff engine is configured to monitor state data provided by the first handoff engine, determine a condition of the first handoff engine using the state data and the other of the first data or the copy of first data, and based on the determination, provide instructions for the secondary appliance to provide the other of the first data or the copy of the first data to the second switch.

In another aspect, a system for optimizing network traffic is described. The system includes an appliance having one or more processors and comprising a first interface configured to receive one of first data or a copy of first data from a first switch, a second interface configured to provide communications to a second switch, and a first handoff engine. The first handoff engine is configured to acquire information indicating that the first handoff engine is in a passive state, monitor state data provided by a second handoff engine that is in an active state, determine a condition of the second handoff engine using the state data and the one of the first data or the copy of first data, and based on the determination, provide instructions for the appliance to provide the one of the first data or the copy of the first data to the second switch.

In another aspect, a method performed by an appliance having one or more processors is described. The method includes acquiring information indicating that a first handoff engine is in a passive state, receiving one of first data or a copy of first data from a first switch, monitoring state data provided by a second handoff engine that is in an active state, determining a condition of the second handoff engine using the first state data and the one of the first data or the copy of the first data, and providing the one of the first data or the copy of the first data to a second switch based on the determination. In yet another aspect, non-transitory computer readable storage medium is described. The storage medium stores a set of instructions that are executable by at least one processor of an appliance to cause the appliance to perform a method for optimizing network traffic. The method can include acquiring information indicating that a first handoff engine is in a passive state, receiving one of first data or a copy of first data from a first switch, monitoring state data provided by a second handoff engine that is in an active state, determining a condition of the second handoff engine using the state data and the one of the first data or the copy of the first data, and providing the one of the first data or the copy of the first data to a second switch based on the determination.

BRIEF DESCRIPTION OF THE DRAWINGS

Reference will now be made to the accompanying drawings showing example embodiments of this disclosure. In the drawings.

DETAILED DESCRIPTION

Reference will now be made in detail to the exemplary embodiments implemented according to the present disclosure, the examples of which are illustrated in the accompanying drawings. Wherever possible, the same reference numbers will be used throughout the drawings to refer to the same or like parts.

The embodiments described herein provide seamless TCP connection handoff. The seamless handoff of TCP connections from one middlebox device to another can avoid or mitigate network down time, and improve quality of service by providing uninterrupted network throughput during hardware and/or software malfunctions.

Figure 1:
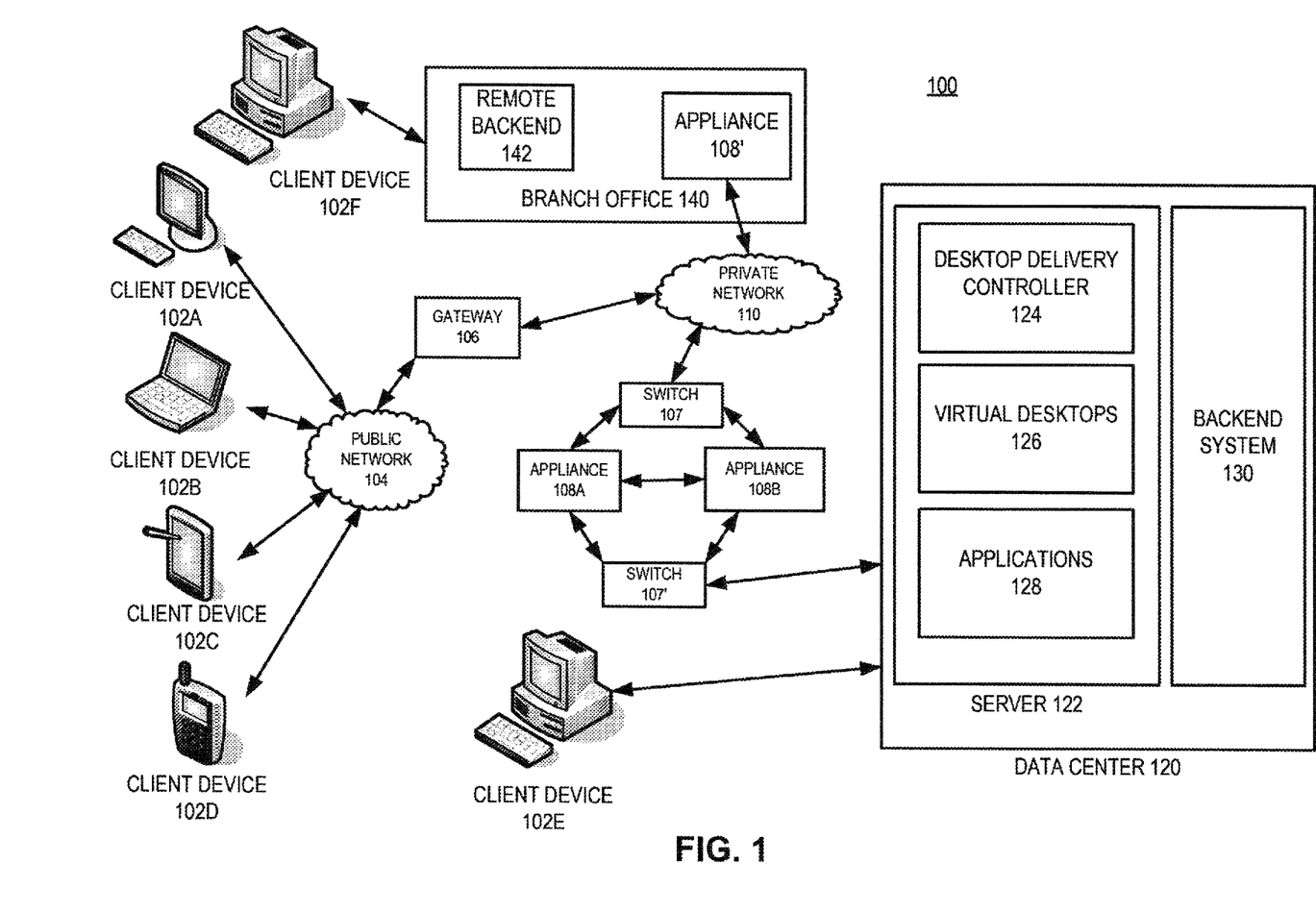
FIG. 1 is a block diagram of an exemplary network environment, consistent with embodiments of the present disclosure.

FIG. 1 is a block diagram of an exemplary network environment 100. While exemplary network environment 100 is directed to a virtual network environment, it is appreciated that the network environment can be any type of network that communicates using packets. Network environment 100 can include one or more client devices 102; a public network 104; a gateway 106; switches 107 and 107'; appliances 108A, 108B, and 108'; a private network 110; a data center 120; and a branch office 140.

One or more client devices 102 are devices that can acquire remote services from data center 120 through various means. Client devices 102 can communicate with a data center 120 either directly (e.g., client device 102e) or indirectly through a public network 104 (e.g., client devices 102a-d) or a private network 110 (e.g., client device 102f). When client device 102 communicates through public network 104 or private network 110, a communication link can be established. For example, a link can be established by public network 104, gateway 106, switches 107 and 107', and appliances 108A and 108B, thereby providing a client device (e.g. client devices 102a-d) access to data center 120. A link can also be established by branch office 140 including appliance 108', private network 110, and appliance 108, thereby providing a client device (e.g. client device 102f) access to data center 120. While client devices 102 are portrayed as a computer (e.g., client devices 102a, 102e, and 102f), a laptop (e.g., client device 102b), a tablet (e.g., client device 102c), and a mobile smart phone (e.g., client device 102d), it is appreciated that client device 102 could be any type of device (e.g., wearable or smart watch) that communicates packets to and from data center 120.

Public network 104 and private network 110 can be any type of network such as a wide area network (WAN), a local area network (LAN), or a metropolitan area network (MAN). As an example, a WAN can be the Internet or the World Wide Web, and a LAN can be a corporate Intranet. Public network 104 and private network 110 can be a wired network or a wireless network.

Gateway 106 is a physical device or is software that is part of a physical device that interfaces between two networks having different protocols. Gateway 106, for example, can be a server, a router, a host, or a proxy server. In some embodiments, gateway 106 can include or be coupled to a firewall separating gateway 106 from public network 104 (e.g., Internet). Gateway has the ability to modify signals received from client device 102 into signals that appliances 108', 108A, 108B, and/or data center 120 can understand and vice versa.

Switch 107 is a device connecting devices together on a network (e.g., private network 110), by using packet switching to receive, process, and forward data to a destination device (e.g., server 122). Switch 107 can include a plurality of interfaces or ports (not shown) that are connectable to devices located on the private network (such as, for example, appliances 108', 108A, and 108B). Switch 107 can forward TCP flows to and from one or more devices that need to receive the data packets, such as, for example, server 122, backend system 130, and/or another client device 102e. Switch 107 can switch data flows between the one or more devices, rather than broadcasting the same data out of each of its ports. In some embodiments, a first switch (e.g., switch 107) works in conjunction with or cooperation with a second switch (e.g., switch 107') to optimize network traffic to and from private network 110, data center 120 and/or client device 102e. For example switch 107 can assist with providing seamless TCP connection handoff between appliance 108A and/or 108B. Switches 107 and 107' can be functionally the same or similar.

Appliances 108', 108A, and 108B are devices that optimize wide area network (WAN) traffic by including, for example, a quality of service ("QoS") engine (not shown). In some embodiments, appliances 108', 108A, and 108B optimize other types of network traffic, such as local area network (LAN) traffic, metropolitan area network (MAN) traffic, or wireless network traffic. Appliances 108', 108A, and 108B can optimize network traffic by, for example, scheduling data packets in an established communication link so that the data packets can be transmitted or dropped at a scheduled time and rate. In some embodiments, appliances 108', 108A, and 108B are physical devices, such as Citrix System's ByteMobile™, Netscaler™, or CloudBridge™. In some embodiments, appliances 108', 108A, and 108B can be virtual appliances. In some embodiments, appliances 108', 108A, and 108B can be a physical devices having multiple instances of virtual machines (e.g., virtual Branch Repeater). In some embodiments, a first appliance (e.g., appliance 108A) works in conjunction with or cooperation with one or more second appliances (e.g., appliance 108B and/or 108') to optimize network traffic. For example, the first appliance can be located between the WAN and a corporate LAN (e.g., data center 120), while the second appliance can be located between a branch office (e.g., branch office 140) and a WAN connection.

In some embodiments, appliances 108', 108A, and 108B may be configured on one side of private network 110 to receive network traffic from public network 104. Appliances 108A and 108B may be configured to work in conjunction with one another to provide seamless TCP switchover in the event of hardware and/or software failure. In some embodiments, appliance 108A and 108B can be functionally the same or similar. Although depicted as two devices in FIG. 1, 108A and 108B may include any number of operatively connected middlebox appliances configured to provide seamless TCP handoff from one appliance to another.

In some embodiments, the functionality of gateway 106 and appliances 108A and 108B can be located in a single physical device. Appliances 108A. 108B, and 108' can be functionally the same or similar. In some embodiments, appliances 108A and 108B (along with switches 107' and 107') can replace appliance 108' in branch office 140. Appliances 108A and 108B are further described below corresponding to FIG. 3A.

Data center 120 is a central repository, either physical or virtual, for the storage, management, and dissemination of data and information pertaining to a particular public or private entity. Data center 120 can be used to house computer systems and associated components, such as one or more physical servers, virtual servers, and storage systems. Data center 120 can include, among other things, one or more servers (e.g., server 122) and a backend system 130. In some embodiments data center 120 can include gateway 106, appliances 108A and 108B, in any combination.

Server 122 is an entity represented by an IP address and can exist as a single entity or a member of a server farm. Server 122 can be a physical server or a virtual server. In some embodiments, server 122 can include a hardware layer, an operating system, and a hypervisor creating or managing one or more virtual machines. Server 122 provides one or more services to an endpoint. These services include providing one or more applications 128 to one or more endpoints (e.g., client devices 102*a-f* or branch office 140). For example, applications 128 can include Microsoft Windows™-based applications and computing resources.

Desktop delivery controller 124 is a device that enables delivery of services, such as virtual desktops 126 to client devices (e.g., client devices 102*a-f* or branch office 140). Desktop delivery controller 124 provides functionality required to manage, maintain, and optimize all virtual desktop communications.

In some embodiments, the services include providing one or more virtual desktops 126 that can provide one or more applications 128. Virtual desktops 126 can include hosted shared desktops allowing multiple user to access a single shared Remote Desktop Services desktop, virtual desktop infrastructure desktops allowing each user to have their own virtual machine, streaming disk images, a local virtual machine, individual applications (e.g., one or more applications 128), or a combination thereof.

Backend system 130 is a single or multiple instances of computer networking hardware, appliances, or servers in a server farm or a bank of servers and interfaces directly or indirectly with server 122. For example, backend system 130 can include Microsoft Active Directory™, which can provide a number of network services, including lightweight directory access protocol (LDAP) directory services, Kerberos-based authentication, domain name system (DNS) based naming and other network information, and synchronization of directory updates amongst several servers. Backend system 130 can also include, among other things, an Oracle™ backend server, a SQL Server backend, and/or a dynamic host configuration protocol (DHCP). Backend system 130 can provide data, services, or a combination of both to data center 120, which can then provide that information via varying forms to client devices 102 or branch office 140.

Branch office 140 is part of a local area network (LAN) that is part of the WLAN having data center 120. Branch office 140 can include, among other things, appliance 108 and remote backend 142. In some embodiments, appliances 108', 108A, and 108B can sit between branch office 140 and private network 110. As stated above, appliance 108' can work with appliances 108A and/or 108B. Remote backend 142 can be set up in similar manner as backend system 130 of data center 120. Client device 102*f* can be located on-site to branch office 140 or can be located remotely from branch office 140.

Appliances 108A, 108B, 108', and gateway 106 can be deployed as or executed on any type and form of specific computing device (e.g., such as the computing device of FIGS. 2A-2B) capable of communicating on any type and form of network described herein. Appliances 108A, 108B, 108', and gateway 106 can be deployed individually or operatively connected together.

Figure 2A:
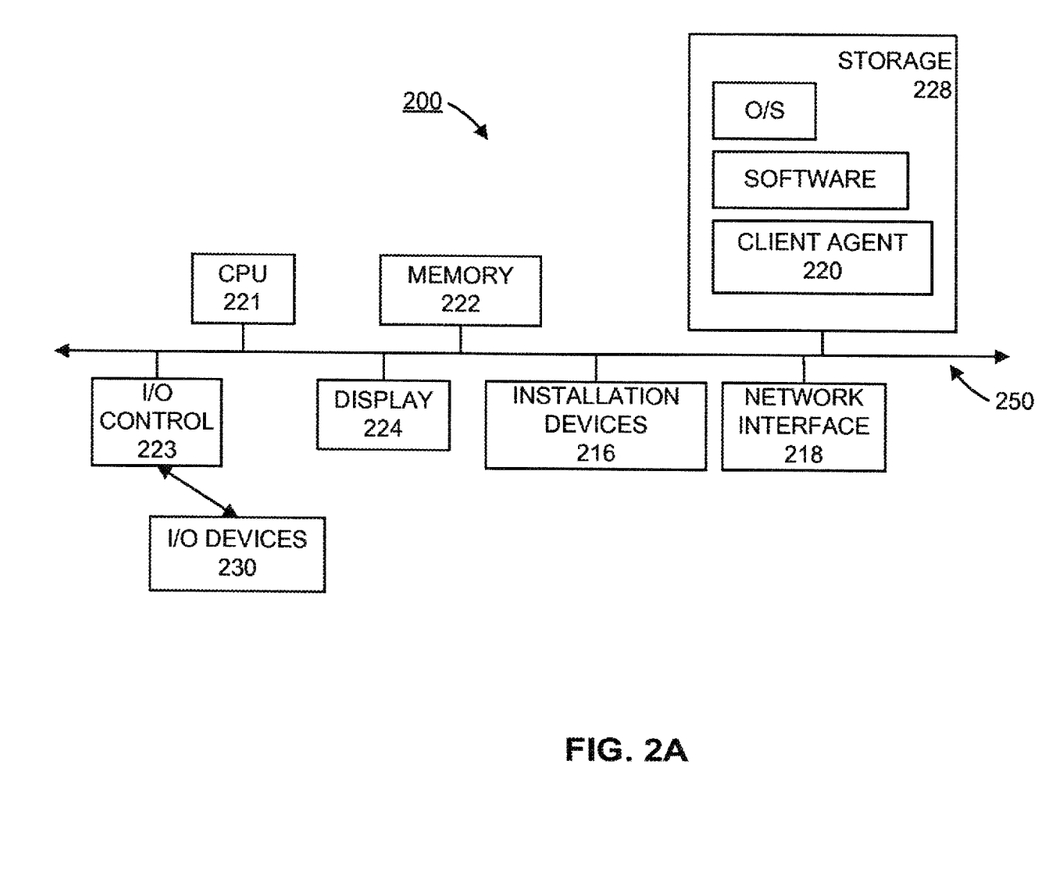
FIGS. 2A-2B are block diagrams of an exemplary computing device, consistent with embodiments of the present disclosure.
Figure 2B:
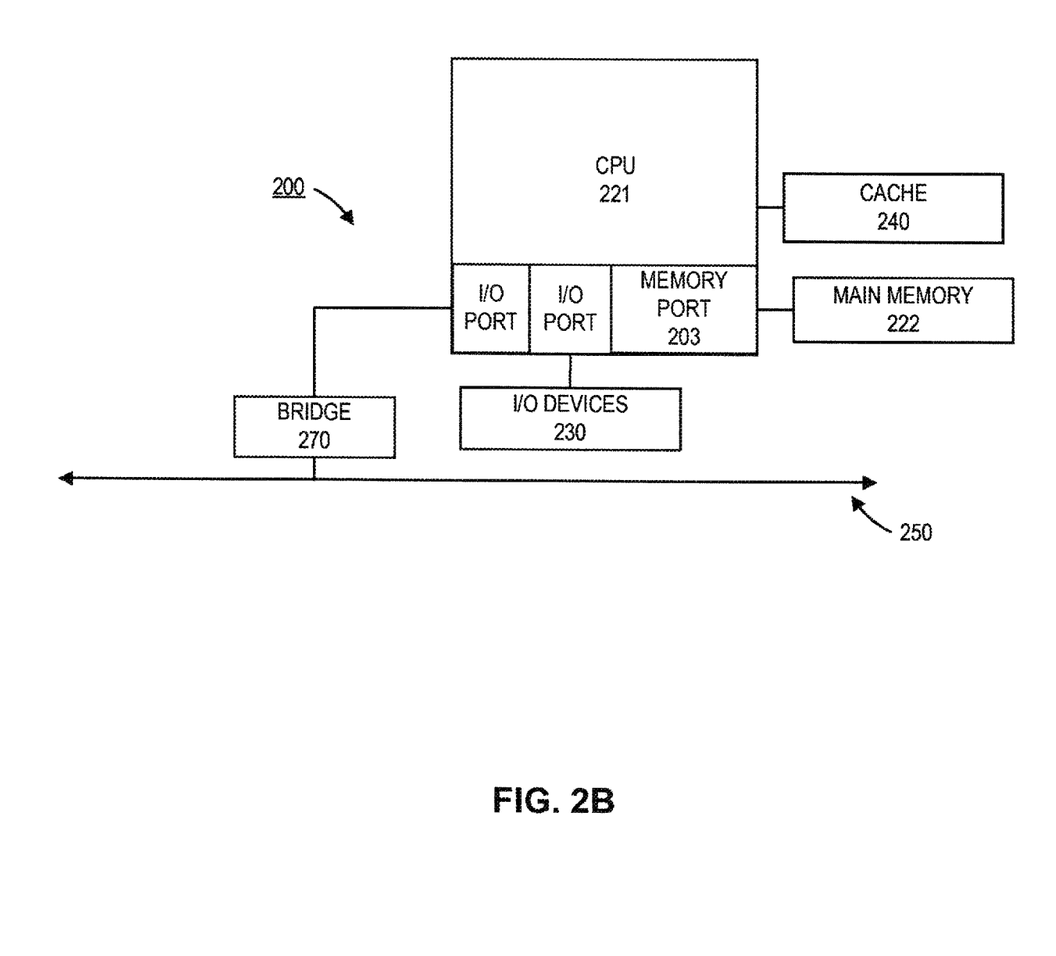

As shown in FIGS. 2A-2B, each computing device 200 includes a central processing unit (CPU) 221 and a main memory 222. CPU 221 can be any logic circuitry that responds to and processes instructions fetched from the main memory 222. CPU 221 can be a single or multiple microprocessors, field-programmable gate arrays (FPGAs), or digital signal processors (DSPs) capable of executing particular sets of instructions stored in a memory (e.g., main memory 222) or cache (e.g., cache 240). The memory includes a tangible and/or non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), flash drive, flash memory, registers, caches, or a semiconductor memory. Main memory 222 can be one or more memory chips capable of storing data and allowing any storage location to be directly accessed by CPU 221. Main memory 222 can be any type of random access memory (RAM), or any other available memory chip capable of operating as described herein. In the exemplary embodiment shown in FIG. 2A, CPU 221 communicates with main memory 222 via a system bus 250. Computing device 200 can also include a visual display device 224 and an input/output (I/O) device 230 (e.g., a keyboard, mouse, or pointing device) connected through 110 controller 223, both of which communicate via system bus 250. One of ordinary skill in the art would appreciate that CPU 221 can also communicate with main memory 222 and other devices in manners other than through system bus 250, such as through serial communication manners or point-to-point communication manners. Furthermore, I/O device 230 can also provide storage and/or an installation medium for the computing device 200.

FIG. 2B depicts an embodiment of an exemplary computing device 200 in which CPU 221 communicates directly with main memory 222 via a memory port 203. CPU 221 can communicate with a cache 240 via a secondary bus (not shown), sometimes referred to as a backside bus. In some other embodiments. CPU 221 can communicate with cache 240 via system bus 250. Cache 240 typically has a faster response time than main memory 222. In some embodiments, such as the embodiment shown in FIG. 2B, CPU 221 can communicate directly with I/O device 230 via an I/O port (not shown). In further embodiments, I/O device 230 can be a bridge 270 between system bus 250 and an external communication bus, such as a USB bus, an Apple Desktop Bus, an RS-232 serial connection, a SCSI bus, a FireWire™ bus, a FireWire 800™ bus, an Ethernet bus, an AppleTalk™ bus, a Gigabit Ethernet bus, an Asynchronous Transfer Mode bus, a HIPPI bus, a Super HIPPI bus, a SerialPlus bus, a SCI/LAMP bus, a FibreChannel™ bus, or a Serial Attached small computer system interface bus, or some other type of data bus.

As shown in FIG. 2A, computing device 200 can support any suitable installation device 216, such as a disk drive or other input port for receiving one or more computer-readable media such as, for example, a USB device, flash drive, SD memory card; a hard-drive; or any other device suitable for installing software and programs such as any client agent 220, or portion thereof. Computing device 200 can further comprise a storage device 228, such as one or more hard disk drives or redundant arrays of independent disks, for storing an operating system and other related software, and for storing application software programs such as any program related to client agent 220. Optionally, any of the installation devices 216 could also be used as storage device 228.

Furthermore, computing device 200 can include a network interface 218 to interface to a LAN, WAN. MAN, or the Internet through a variety of links including, but not limited to, standard telephone lines, LAN or WAN links (e.g., 802.11, T1, T3, 56 kb, X.25), broadband links (e.g., ISDN, Frame Relay, ATM), wireless connections (Wi-Fi, Bluetooth, Z-Wave, Zigbee), or some combination of any or all of the above. Network interface 218 can comprise a built-in network adapter, network interface card, PCMCIA network card, card bus network adapter, wireless network adapter. USB network adapter, modem or any other device suitable for interfacing computing device 200 to any type of network capable of communication and performing the operations described herein.

Figure 3A:
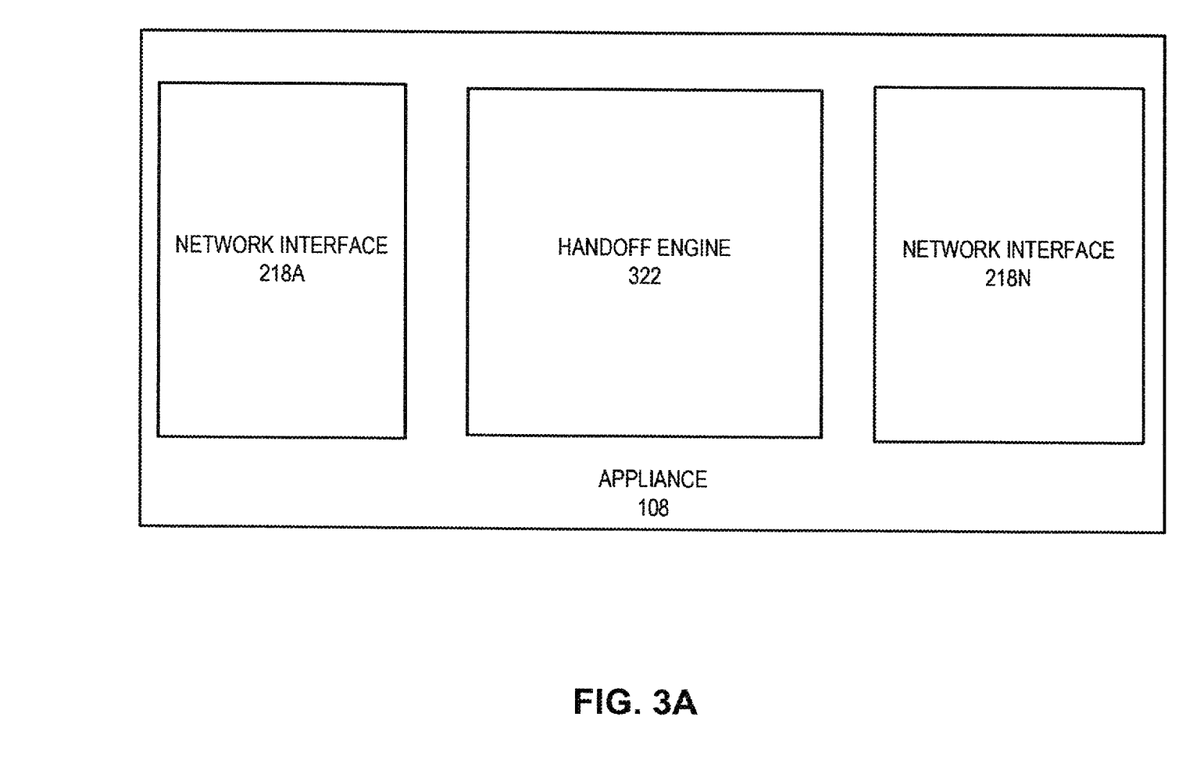
FIG. 3A is a block diagram of an exemplary appliance illustrated in FIG. 1, consistent with embodiments of the present disclosure.

FIG. 3A is a block diagram of an exemplary appliance 108 (including 108A and 108B) and/or 108' illustrated in FIG. 1, consistent with embodiments of the present disclosure. Appliance 108 can include one or more network interfaces 218A-N consistent with network interface 218 of FIG. 2A, and one or more handoff engines 322. Although FIG. 3A depicts network interfaces 218A-218N as two network interfaces, it is appreciated that interfaces 218A-218N can include any number of network interfaces.

In some aspects, handoff engine 322 can operate on two or more devices functionally connected for seamless TCP handover. Each device can be configured as either a primary (active) device or a secondary (passive) device. Handoff engine 322 can run in active mode on the primary and in passive mode on the secondary. Although depicted in FIG. 3A as handoff engine 322, reference will be made to handoff engine 322A that operates in appliance 108A (as depicted in FIG. 4), and handoff engine 322B that operates in appliance 108B (also depicted in FIG. 4).

Figure 3B:
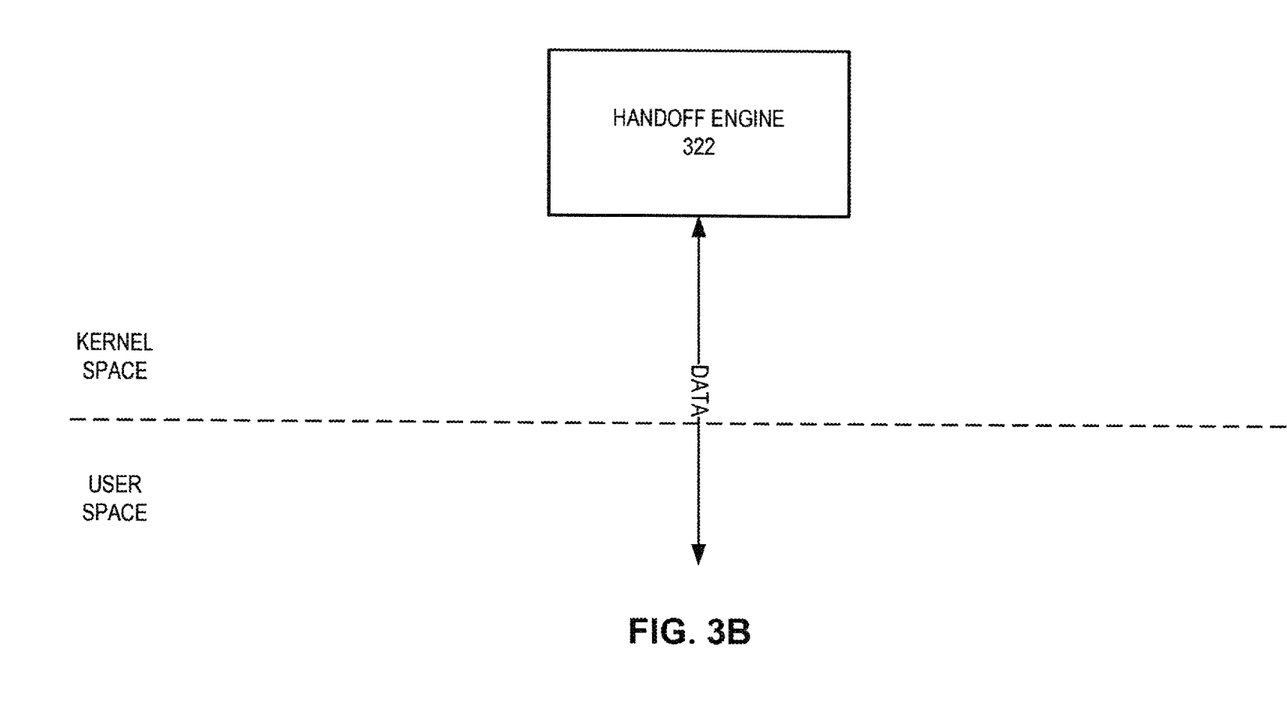
FIG. 3B is a block diagram of a portion of an exemplary appliance illustrated in FIG. 3A, consistent with embodiments of the present disclosure.

FIG. 3B is a block diagram of a portion of exemplary appliances 108A and/or 108B illustrated in FIG. 3A, consistent with embodiments of the present disclosure. In some embodiments, the operating system of appliances 108A and 108B allocates, manages, or otherwise segregates the available system memory into what is referred to as kernel space (system space) and user space (application space). The kernel space is typically reserved for running the kernel, including any device drivers, kernel extensions, or other kernel related software. The kernel can be the core of the operating system, and provides access, control, and management of resources and hardware-related elements of appliances 108A and 108B. In some aspects, the kernel space can also include a number of network services or processes working in conjunction with handoff engine 322, or any portion thereof. Additionally, the embodiments of the kernel can depend on the operating system installed, configured, or otherwise used by appliances 108A and 108B.

User space is the memory area or portion of the operating system used by user mode applications or programs otherwise running in user mode. A user mode application cannot access kernel space directly and uses service calls to access kernel services. The operating system uses the user space for executing or running applications and provisioning of user level programs, services, processes, and/or tasks. As an example, the operating system can execute software of network interfaces 218A-N in the user space.

Figure 4:
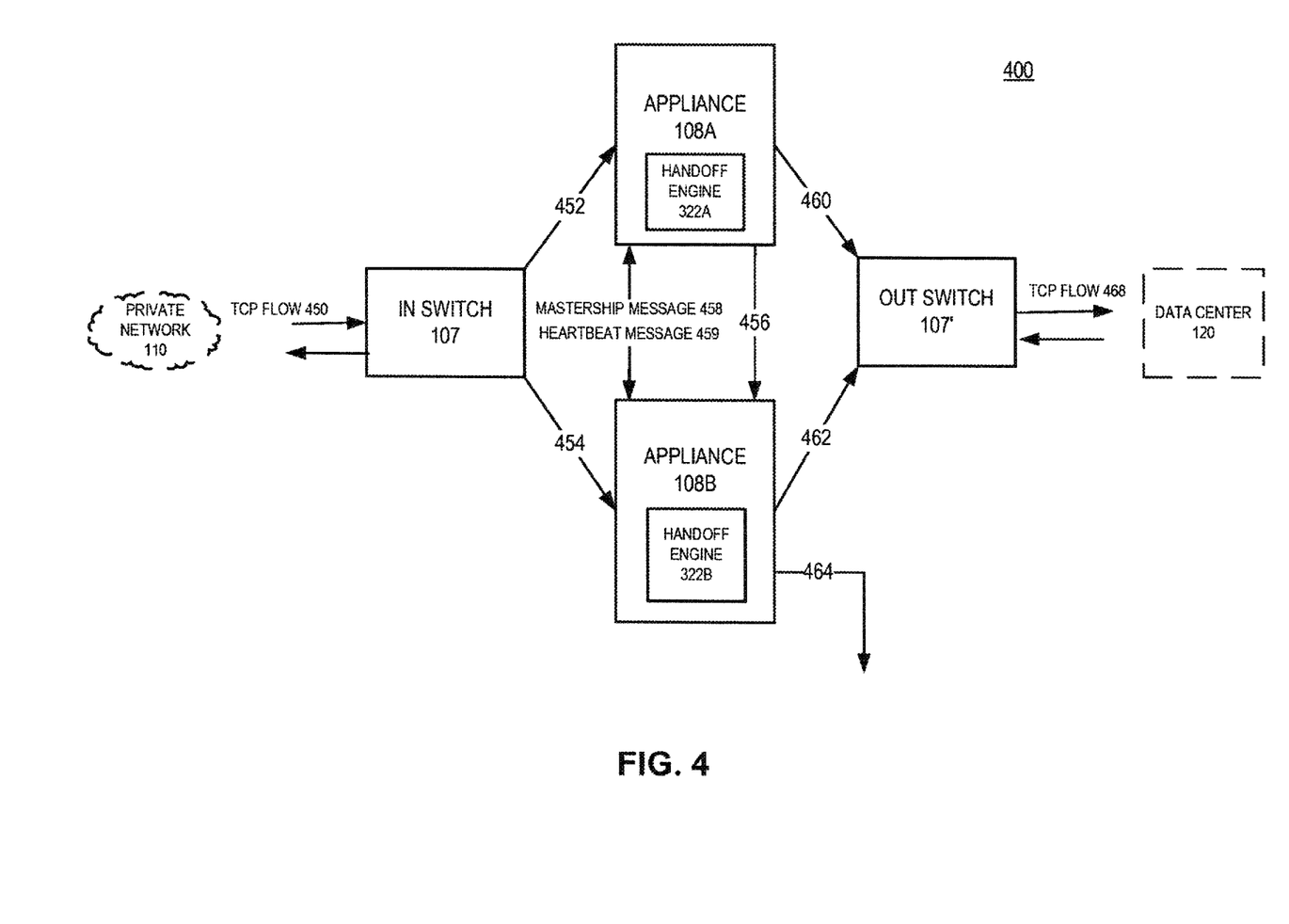
FIG. 4 is a block diagram of an exemplary embodiment for seamless TCP connection handoff, consistent with embodiments of the present disclosure.

FIG. 4 is a block diagram of an exemplary embodiment for seamless TCP connection handoff 400, consistent with embodiments of the present disclosure. According to some embodiments, appliance 108A and 108B may be configured as active and passive devices, respectfully. Appliance 108A and 108B may send and receive packets via in switch 107 and out switch 107'. Although depicted as "in" and "out" switches for purposes of simplicity, it should be appreciated that TCP flows 450 and 468 occur in two directions (such as from private network 110 flowing to data center 120, and vice versa). Accordingly, switch 107 may route outgoing TCP traffic flowing toward private network 110, and out switch 107' may route incoming traffic from data center 120 flowing toward private network 110.

According to some embodiments, appliances 108A and 108B work in conjunction with one another to seamlessly switch the responsibility of processing and routing data from one appliance to another in the event of equipment and/or software malfunction (e.g., the primary appliance experiences a failover condition). In general, the primary appliance is active, while the secondary appliance is passive (keeping all TCP states continually updated and in sync with the primary appliance without participating in the routing. Accordingly, because all TOP states are maintained in sync with the primary device at secondary device, the passive device is ready to become active and take over seamlessly if it detects that the primary appliance (the active device) experiences a failover condition.

During the lifetime of a TCP flow, appliances 108 and 108' undergo a series of state changes. The finite state machine operating as part of the transmission communication protocol (TCP) communication processes the state changes. Processing the state changes can include causing the state machine to derive state change events from the TCP header, and modifying the header to include different states according to the predefined protocol. Examples of state changes can include, for example, a listen state, representing an end point waiting for a connection request from any remote TCP and port; SYN-SENT states, which represent a state of waiting for a matching connection request after having sent a connection request, SYN-RECEIVED . . . , etc. It is appreciated that TOP states include a wide variety of established protocols associated with establishing TCP connections, closing TCP connections, allocating network resources, transferring data, detecting errors, etc.

Appliance 108A and 108B can operate in active state or passive state. As used herein, a device in an active state participates directly with processing data, sending data, receiving data, etc. Appliance 108 may operate as the primary device when in active state, and may operate as the secondary device while in passive state. In this particular example, appliance 108A will start off as the primary device, while appliance 108B will start off as the secondary device. In active state, handoff engine 322A operating on appliance 108A synchronizes TCP data with each of the passive secondary devices, such as appliance 108B. The TCP states for the connections are continually updated on the one or more passive devices via heartbeat 459. Handoff engine 322A, when in active state, is responsible for communication at the TCP level by receiving and routing TCP traffic, and communicating with handoff engine 322B of the secondary (passive) device.

When operating in a passive state, a device maintains all TCP states as though it were actively participating in data routing and transfer. According to some embodiments, handoff engine 322B, when in a passive state, updates the record indicative of TCP states of the active appliance (e.g., appliance 108A) but does not take part in communication at TCP level. In other words, the TCP states are kept "hot" on appliance 108B (the secondary device), and can readily accept a switchover from appliance 108A (the primary device) without any interruption to the active TCP flow. In the event of a primary appliance failover, appliance 108B, which is operating as the passive device, switches to active mode by routing all TCP flows and seamlessly takes part in data transfer as the (now) primary appliance (depicted as forward data 462). After the switchover, appliance 108A becomes the new passive device, and 108B becomes the new active device.

Before a switchover takes place, appliances 108A and 108B communicate via a mastership message 458 and one or more heartbeat messages 459. When handoff engines 322 are instantiated, handoff engine 322A and handoff engine 322B communicate with one another via mastership message 458, and agree upon which device is to operate as the active device and which device is to act as the passive device.

Regular exchanges of information, depicted in FIG. 4 as heartbeat messages 459, are exchanged by handoff engine 322A and 322B to exchange information indicative of the functional condition of the primary (active) appliance. At each heartbeat, each passive device determines whether the active device is working properly or whether it should take over data communication and send instructions to the active device to become passive. Heartbeat message 459 can be a periodic signal generated by hardware and/or software to indicate normal operation or to synchronize other parts of a system. Appliances 108A and 108B may send heartbeat signals at a periodic interval of time or at set times, or with each new data packet received in a TCP flow. Generally, if the secondary device does not receive expected heartbeat message 459 from the primary device, the secondary device assumes that the primary device has failed.

When appliance 108A is functioning normally (that is, not in a fault condition), switch 107 receives one or more data packets via TOP flow 450, duplicates the incoming data packets (depicted in FIG. 4 as first data 452 and copy of first data 454). Accordingly, switch 107 forwards the data packet (e.g., the data packet received by switch 107, depicted as first data 452) to appliance 108A, and a copy of first data 454 to appliance 108B. Data transfer of data packet 452 and copy of first data 454 may occur simultaneously or at substantially the same time. According to some embodiments, when functional (not experiencing a software and/or hardware failure) appliance 108A processes the first data, and generates and forwards data 460 to out switch 107' for routing to data center 120. Appliance 108A processes the first data by modifying the header information to include updated TCP state information. Appliance 108A sends a copy of the processed data 460 (depicted as state data 456) to appliance 108B.

According to some embodiments, appliance 108A receives first data 452 from switch 107, and appliance 108B receives a copy of first data 454. In another aspect, appliance 108B receives the first data and appliance 108A receives the copy of the first data.

Appliance 108B determines the functional condition of the active handoff engine 322A in appliance 108A by processing the copy of first data 454 and comparing the processed copy of first data 454 and state data 456. Appliance 108B (and/or handoff engine 322B) processes the copy of first data 454, and compares the processed copy of first data 454 to state data 456 with respect to the time each are received by appliance 108B. According to some embodiments, if handoff engine 322B receives the copy of first data 454 from switch 107, but does not receive state data 456 from appliance 108A within an expected period of time (e.g., within 500 milliseconds), handoff engine 322B determines that appliance 108A is experiencing a failover condition. A failover condition indicates that appliance 108A did not forward the data to out switch 107' (and thus, data forward 460 did not happen according to appliance 108B). Accordingly, appliance 108B transmits a switchover message to the active handoff engine 322A, changes the state of the handoff engine 322B to be active, and forwards the processed data 462 to out switch 107'. The switchover message includes instructions for the formerly active device to become the passive device, and to process and drop any new data packets received.

If appliance 108B receives the state data 456 within the predetermined time, or proximate in time (for example, within 300-500 milliseconds from receiving copy of first data 454, handoff engine 322B determines that appliance 108A is functioning correctly. Accordingly, handoff engine 322B updates memory 222 (residing on appliance 108B) with the current TCP state of the active device. Handoff engine 322B drops the processed copy of first data 454 (the drop depicted in FIG. 4 as drop data 464), because the active device has indicated that it is functioning properly based on state data 456 and handoff engine 322B assumes that active device has forwarded data 460, rendering useless the processed copy of first data 454.

Figure 5:
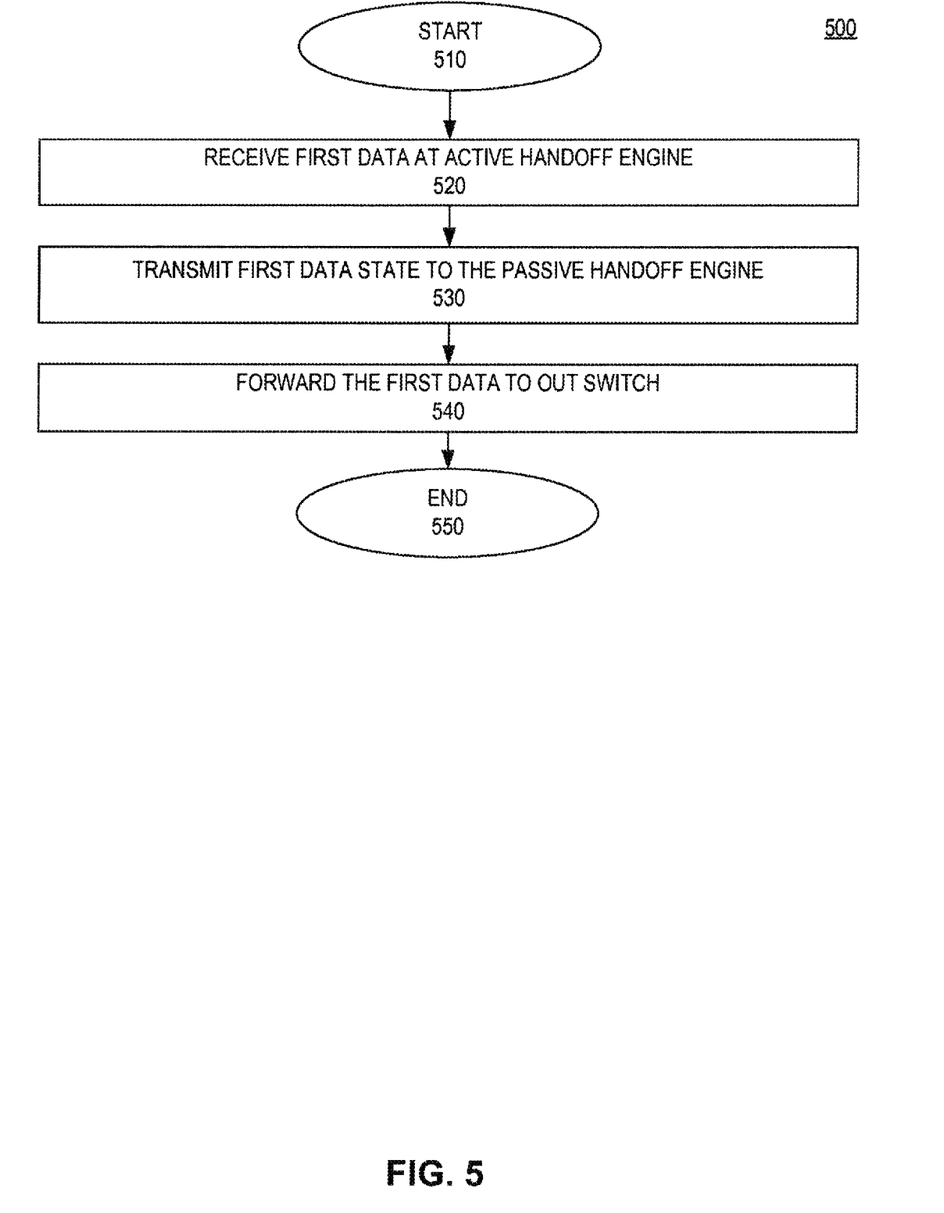
FIG. 5 is a flowchart representing an exemplary method of seamless TCP connection handoff, consistent with embodiments of the present disclosure.

FIG. 5 is a flowchart representing an exemplary method 500 for seamless TCP connection handoff, consistent with embodiments of the present disclosure. It will be readily appreciated that the illustrated procedure can be altered to delete steps or further include additional steps. While method 500 is described as being performed by a primary appliance (e.g., appliance 108A having handoff engine 322A), it is appreciated that method 500 can be performed by other devices alone or in combination with another appliance. Moreover, it is appreciated that the primary appliance has messaged a secondary appliance (e.g., appliance 108B having handoff engine 322B) via one or more mastership messages 458 and/or one or more heartbeat messages 459.

After an initial start step 510, appliance 108A receives first data 452 via the active handoff engine 322A. In some embodiments, after receiving first data 452, appliance 108A can process first data 452. The processing can include modification to TOP headers for optimizing the TCP traffic and/or compressing/decompressing the TCP data.

After receiving first data 452, appliance 108A transmits the state of the first data to passive handoff engine 322B of secondary appliance 108B (step 530). In some embodiments, the state data can include data 460 forwarded to out switch 107'. The transmission of the state of the first data can be part of the heartbeat messages 459 or can be a separate transmission, such as the transmission of state data 456. The secondary appliance can determine the functional condition of primary appliance using the state data. If the state data indicates that an error or malfunction has occurred, secondary appliance can assume the responsibilities of primary appliance. In some embodiments, the lack of receipt of state data at secondary appliance indicates that primary appliance has malfunctioned.

Handoff engine 322A forwards processed first data 452 to out switch 107' (step 540). In some embodiments, forwarding step 540 occurs prior to transmission step 530. In such embodiments, the state data can indicate that the data was forwarded.

Figure 6:
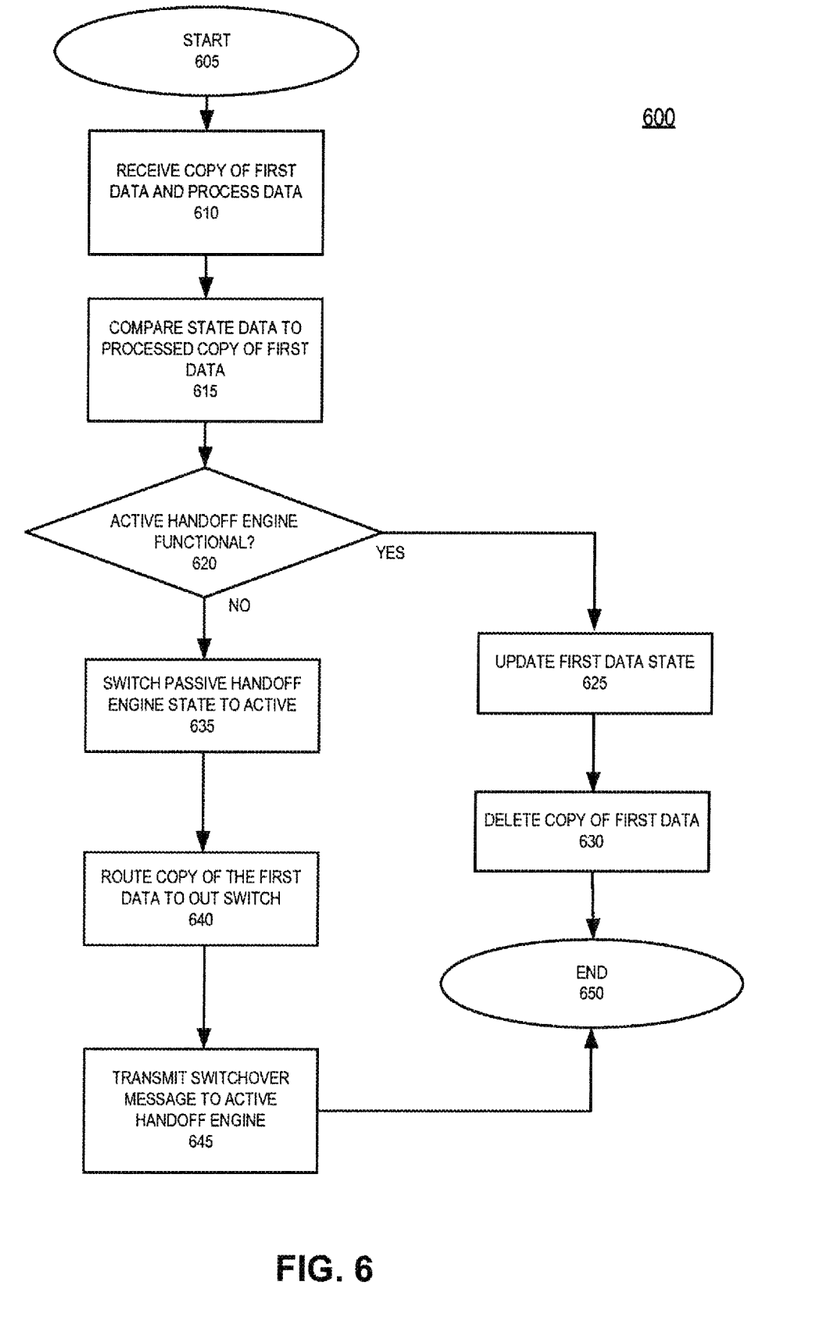
FIG. 6 is a flowchart representing an exemplary method of determining a functional condition of the active high availability engine, consistent with embodiments of the present disclosure.

Referring now to FIG. 6, an exemplary method 600 for determining a functional condition of the active appliance is described, consistent with embodiments of the present disclosure. It will be readily appreciated that the illustrated procedure can be altered to delete steps or further include additional steps. While method 600 is described as being performed by a secondary appliance (e.g., appliance 108B having handoff engine 322B), it is appreciated that method 600 can be performed by other devices alone or in combination with another appliance. Moreover, it is appreciated that the secondary appliance has been messaged by a primary appliance (e.g., appliance 108A having handoff engine 322A) via one or more mastership messages 458 and/or one or more heartbeat messages 459.

After an initial starting step 605, at step 610 appliance 108B receives a copy of first data 454 and processes the copy of first data 454. At step 615, after processing the copy of first data 454, handoff engine 322B compares state data 456 with the processed copy of first data 454, in order to determine a functional condition of the active appliance that is presently configured to receive data, and route the data to its intended destination. To make the comparison of the processed copy of first data 454 with state data 456, handoff engine 322B evaluates a first time of receipt of the processed copy of first data 454, and a second time of receipt of state data 456.

At step 620, appliance 108B, using the comparison, determines whether the primary (active) appliance 108A is functional. If the first time of receipt exceeds the second time of receipt by a predetermined period of time (for example, 500 milliseconds), appliance 108B determines that active handoff engine 322A is not functional. If it is determined that primary appliance 108A is functional, at step 625 handoff engine 322B updates the first data state in main memory 222 and deletes the processed copy of the first data 454 (step 630). In some embodiments, instead of deleting the copy, the stored copy can be replaced by later incoming data. After the removal of the copy of first data (via either being deleted or replaced), method 600 ends at step 650.

If handoff engine 322B determines that the primary appliance is not functional, at step 635 handoff engine 322B switches its engine state from passive to active. In the new active handoff engine state, appliance 108B takes over communication control from appliance 108A. At step 640, appliance 108B routes the copy of first data 454 (or a processed version of it) to out switch 107'.

According to some embodiments, at step 645, handoff engine 322B transmits a switchover message to active handoff engine 322A. By transmitting a switchover message, handoff engine 322B can instruct appliance 108A (the formerly active appliance that is now known to be malfunctioning) to stop forwarding any received packets. The switchover message can include instructions to change the state of the active handoff engine 322A to a new passive handoff engine 322. Accordingly, new passive handoff engine 322A drops any new data packets to avoid duplication of data packets now being forwarded by new active handoff engine 322B. Method 600 ends at step 650.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

The invention claimed is:

1. A system comprising:
 a primary appliance having one or more processors and comprising a first handoff engine in an active state, wherein the primary appliance is configured to receive from a first switch one of first data or a copy of first data to be processed before being provided to a second switch; and
 a secondary appliance having one or more processors and comprising a second handoff engine in a passive state, wherein the secondary appliance is configured to receive from the first switch the other of the first data or the copy of the first data, wherein the second handoff engine is configured to:
  process the other of the first data or the copy of the first data,
  monitor state data provided by the first handoff engine, with the state data corresponding to the processed first data or the processed copy of the first data,
  determine a functional condition of the first handoff engine based on a time different between when the state data was received and when the other of the processed first data or the processed copy of first data was received, and
  based on the determination, provide instructions for the secondary appliance to provide the other of the processed first data or the processed copy of the first data to the second switch.

2. The system of claim 1, wherein the one of the first data or the copy of the first data provided to the second switch has been processed by the appliance.

3. The system of claim 1, wherein the primary appliance is further configured to modify the one of first data or a copy of first data to include a new TCP state and provide the modified one of first data or the copy of first data to the second switch.

4. An appliance having one or more processors and comprising:
 a first interface configured to receive one of first data or a copy of first data from a first switch;
 a second interface configured to provide communications to a second switch; and
 a first handoff engine configured to:
  process the received first data or the copy of first data,
  acquire information indicating that the first handoff engine is in a passive state,
  monitor state data provided by a second handoff engine that is in an active state, with the state data corresponding to the other of first data or the copy of the first data having been processed by the second handoff engine,
  determine a functional condition of the second handoff engine based on a time different between when the state data was received and when the processed first data or the processed copy of first data was received, and
  based on the determination, provide instructions for the appliance to provide the other of the processed first data or the processed copy of the first data to the second switch.

5. The appliance of claim 4, wherein the one of the first data or the copy of the first data provided to the second switch has been processed by the appliance.

6. The appliance of claim 4, wherein the first data or the copy of the first data is included in one or more data packets.

7. The appliance of claim 4, wherein the first handoff engine is configured to determine the functional condition of a second appliance associated with the second handoff engine, wherein the determination involves the first handoff engine being further configured to:
   acquire a first time of receipt of the one of first data or the copy of first data;
   acquire a second time of receipt of the state data; and
   determine whether the second time of receipt exceeds a predetermined time period from the first time of receipt.

8. The appliance of claim 4, wherein the instructions include:
   if the second handoff engine is determined to correspond to a nonfunctional appliance: instructions for changing the first handoff engine from a passive state to an active state, wherein the change to the active state corresponds to the appliance being configured to provide the one of first data or the copy of first data to the second switch.

9. The appliance of claim 8, wherein the change to the active state corresponds to the appliance being further configured to transmit a switchover message to a second appliance corresponding to the second handoff engine, wherein the switchover message includes instructions to change a state of the second appliance to a passive state.

10. A method performed by an appliance having one or more processors and comprising:
   acquiring information indicating that a first handoff engine is in a passive state;
   receiving one of first data or a copy of first data from a first switch;
   processing the received first data or the copy of the first data;
   monitoring state data provided by a second handoff engine that is in an active state, with the state data corresponding to the other of the first data or the copy of the first data having been processed by the second handoff engine;
   determining a functional condition of the second handoff engine based on a time different between when the state data was received and when the processed first data or the processed copy of first data was received; and
   providing the other of the processed first data or the processed copy of the first data to a second switch based on the determination.

11. The method of claim 10, wherein the first data is included in one or more data packets.

12. The method of claim 10, wherein determining the functional condition of the second handoff engine using the state data and the one of the first data or the copy of the first data further includes:
   acquiring a first time of receipt of the one of the first data or the copy of the first data; and
   acquiring a second time of receipt of the state data; and
   determining whether the second time of receipt exceeds a predetermined time period from the first time of receipt.

13. The method of claim 12, wherein providing the one of the first data or the copy of the first data to the second switch based on the determination further comprises:
   if the second handoff engine is determined to correspond to a nonfunctional appliance, changing the first handoff engine from a passive state to an active state, and providing the one of first data or the copy of first data to the second switch.

14. The method of claim 13, wherein providing the one of the first data or the copy of the first data to the second switch based on the determination further comprises:
   if the second handoff engine is determined to correspond to a nonfunctional appliance, transmitting a switchover message to a second appliance, wherein the switchover message includes instructions to change a state of the second appliance to a passive state.

15. A non-transitory computer readable storage medium that stores a set of instructions that are executable by at least one processor of an appliance to cause the appliance to perform a method for optimizing network traffic, the method comprising:
   acquiring information indicating that a first handoff engine is in a passive state;
   receiving one of first data or a copy of first data from a first switch;
   processing the received first data or the copy of the first data;
   monitoring state data provided by a second handoff engine that is in an active state, with the state data corresponding to the other of first data or the copy of the first data having been processed by the second handoff engine;
   determining a functional condition of the second handoff engine based on a time different between when the state data was received and when the processed first data or the processed copy of first data was received; and
   providing the other of the processed first data or the processed copy of the first data to a second switch based on the determination.

16. The non-transitory computer readable storage medium of claim 15, wherein determining the functional condition of the second handoff engine using the state data and the one of the first data or the copy of the first data further includes:
   acquiring a first time of receipt of the one of the first data or the copy of the first data;
   acquiring a second time of receipt of the state data; and
   determining whether the second time of receipt exceeds a predetermined time period from the first time of receipt.

17. The non-transitory computer readable storage medium of claim 16, wherein providing the one of the first data or the copy of the first data to the second switch based on the determination further comprises:
   if the second handoff engine is determined to correspond to a nonfunctional appliance, changing the first handoff engine from a passive state to an active state, and providing the one of first data or the copy of first data to the second switch.

18. The non-transitory computer readable storage medium of claim 17, wherein providing the one of the first data or the copy of the first data to the second switch based on the determination further comprises:
   if the second handoff engine is determined to correspond to a nonfunctional appliance, transmitting a switchover message to a second appliance, wherein the switchover message includes instructions to change a state of the second appliance to a passive state.

* * * * *